United States Patent
Tajima et al.

(10) Patent No.: US 7,847,462 B2
(45) Date of Patent: *Dec. 7, 2010

(54) PERMANENT MAGNET ELECTRIC ROTATING MACHINE AND ELECTROMOTIVE VEHICLE USING PERMANENT MAGNET ELECTRIC ROTATING MACHINE

(75) Inventors: Fumio Tajima, Juou-machi (JP); Yutaka Matsunobu, Hitachi (JP); Shouichi Kawamata, Hitachi (JP); Suetaro Shibukawa, Hitachinaka (JP); Osamu Koizumi, Ibaraki-machi (JP); Keiji Oda, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/403,260

(22) Filed: Mar. 12, 2009

(65) Prior Publication Data

US 2009/0174274 A1 Jul. 9, 2009

Related U.S. Application Data

(60) Division of application No. 12/176,024, filed on Jul. 18, 2008, now Pat. No. 7,667,365, which is a division of application No. 11/509,619, filed on Aug. 25, 2006, now Pat. No. 7,446,448, which is a continuation of application No. 11/081,686, filed on Mar. 17, 2005, now Pat. No. 7,119,470, which is a continuation of application No. 10/934,625, filed on Sep. 7, 2004, now Pat. No. 6,876,117, which is a continuation of application No. 10/338,753, filed on Jan. 9, 2003, now Pat. No. 6,822,360, which is a continuation of application No. 09/754,296, filed on Jan. 5, 2001, now Pat. No. 6,798,103, which is a continuation of application No. 08/946,581, filed on Oct. 7, 1997, now Pat. No. 6,208,054.

(30) Foreign Application Priority Data

Oct. 18, 1996 (JP) .................................. 8-275826

(51) Int. Cl.
*H02K 1/22* (2006.01)
*H02K 21/12* (2006.01)

(52) U.S. Cl. ......................... 310/156.57; 310/156.53; 310/156.56

(58) Field of Classification Search ............ 310/156.08, 310/156.21, 126.43–156.49, 156.53–156.57
See application file for complete search history.

(56) References Cited

U.S. PATENT DOCUMENTS 3,628,239 A 12/1971 Hunt et al.

(Continued)

FOREIGN PATENT DOCUMENTS

JP 63-056159 3/1988

(Continued)

OTHER PUBLICATIONS

*The Institute of Electrical Engineers of Japan*, Jul. 7, 1995, Document of the Institute of Electrical Engineers of Japan, pp. 33-42.

(Continued)

*Primary Examiner*—Tran N Nguyen
(74) *Attorney, Agent, or Firm*—Crowell & Moring LLP

(57) ABSTRACT

A magnetic gap is provided between a permanent magnet of a rotor and an auxiliary magnet pole portion which is arranged adjacent to the permanent magnet in a peripheral direction. A gradual change in a magnetic flux density distribution of a surface of the rotor is obtained and a cogging torque and a torque pulsation are restrained. By obtaining a reluctance torque according to the auxiliary magnetic pole, a permanent magnet electric rotating machine in which the cogging torque and the torque pulsation are restrained can be obtained and further an electromotive vehicle having the permanent magnet electric rotating machine can be provided.

18 Claims, 7 Drawing Sheets

U.S. PATENT DOCUMENTS

| | | |
|---|---|---|
| 3,696,260 A | 10/1972 | Lace |
| 3,840,763 A | 10/1974 | Baumann et al. |
| 3,849,682 A | 11/1974 | Binns |
| 4,139,790 A | 2/1979 | Steen |
| 4,403,161 A | 9/1983 | Miyashita et al. |
| 4,404,484 A | 9/1983 | Gillott |
| 4,417,167 A | 11/1983 | Ishii et al. |
| 4,486,679 A | 12/1984 | Jones |
| 4,674,178 A | 6/1987 | Patel |
| 4,998,032 A | 3/1991 | Burgbacher |
| 5,038,065 A | 8/1991 | Matsubayashi et al. |
| 5,097,166 A | 3/1992 | Mikulic |
| 5,117,553 A | 6/1992 | Kliman |
| 5,159,220 A | 10/1992 | Kliman |
| 5,250,867 A | 10/1993 | Gizaw |
| 5,258,678 A | 11/1993 | Futami |
| 5,298,827 A | 3/1994 | Sugiyama |
| 5,343,128 A | 8/1994 | Beltrame et al. |
| 5,359,248 A | 10/1994 | Nagate et al. |
| 5,369,324 A | 11/1994 | Saether |
| 5,369,325 A | 11/1994 | Nagate et al. |
| 5,475,277 A | 12/1995 | Johnson |
| 5,508,576 A | 4/1996 | Nagate et al. |
| 5,510,662 A | 4/1996 | Tanimoto et al. |
| 5,532,531 A | 7/1996 | Sakamoto |
| 5,670,836 A | 9/1997 | Horst |
| 5,672,926 A | 9/1997 | Brandes et al. |
| 5,684,352 A | 11/1997 | Mita et al. |
| 5,838,086 A | 11/1998 | Cuenot et al. |
| 5,844,344 A | 12/1998 | Uetake et al. |
| 5,864,192 A | 1/1999 | Nagate et al. |
| RE36,367 E | 11/1999 | Nagate et al. |
| 6,133,662 A | 10/2000 | Matsunobu et al. |
| 6,208,054 B1 | 3/2001 | Tajima et al. |
| 6,798,103 B2 | 9/2004 | Tajima et al. |
| 6,822,360 B2 * | 11/2004 | Tajima et al. .......... 310/156.53 |
| 6,876,117 B2 | 4/2005 | Tajima et al. |
| 7,119,470 B2 * | 10/2006 | Tajima et al. .......... 310/156.53 |

FOREIGN PATENT DOCUMENTS

| | | |
|---|---|---|
| JP | 63-129884 | 6/1988 |
| JP | 1-286758 | 11/1989 |
| JP | 5-4739 | 1/1993 |
| JP | 05-056583 | 3/1993 |
| JP | 05-076146 | 3/1993 |
| JP | 05-219669 | 8/1993 |
| JP | 05-236685 | 9/1993 |
| JP | 05-238687 | 9/1993 |
| JP | 05-292688 | 11/1993 |
| JP | 05-304737 | 11/1993 |
| JP | 07-031087 | 1/1995 |
| JP | 7-11858 | 2/1995 |
| JP | 07-039091 | 2/1995 |
| JP | 07-143694 | 2/1995 |
| JP | 7-20050 | 4/1995 |
| JP | 08-256440 | 1/1996 |
| JP | 08-107639 | 4/1996 |
| JP | 08-205436 | 8/1996 |
| JP | 08-205437 | 8/1996 |
| JP | 08-251846 | 9/1996 |
| JP | 08-251848 | 9/1996 |
| JP | 08-251891 | 9/1996 |
| JP | 08-331823 | 12/1996 |
| WO | WO 92/07409 | 4/1992 |

OTHER PUBLICATIONS

*The Institute of Electrical Engineers of Japan*, Apr. 1997, vol. 107, No. 4—Journal of the Institute Electrical Engineers of Japan, p. 344.

*IEE Japan*, Mar. 1992—Document of 1992 National Convention on Reocrd, pp. 7-11.

"A Rotor Lamination Design for Surface Permanent Magnet Retention at High Speeds", by Michael W. Degner et al., IEEE transactions on Industry Applications. vol. 32, No. 2, Mar./Apr. 1996, pp. 380-385.

Official Letter from Japanese Patent Office dated May 13, 2001.

Richard F. Schiferl et al., *Power Capability of Salient Pole Permanent Magnet Synchronous Motors in Variable Speed Drive Applications*, IEEE Transactions on Industry Applications, vol. 26, No. 1, Jan./Feb. 1990, pp. 115-123.

V.B. Honsinger, *The Fields and Parameters of Interior Type AC Permanent Magnet Machines*, IEEE Transactions on Power Apparatus and Systems, vol. PAS-101, No. 4, Apr. 1982, pp. 867-876.

* cited by examiner

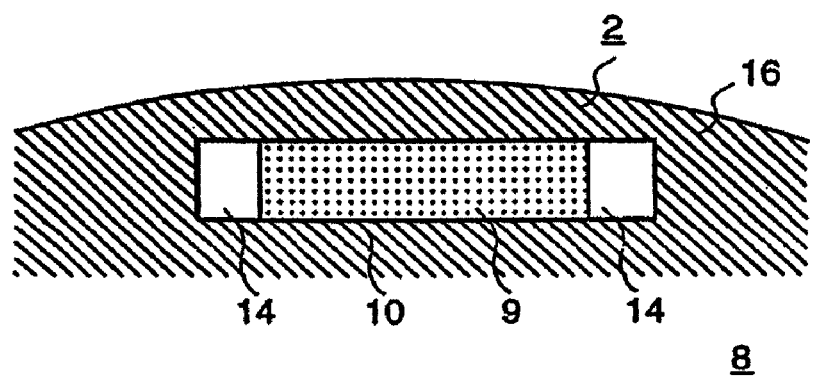
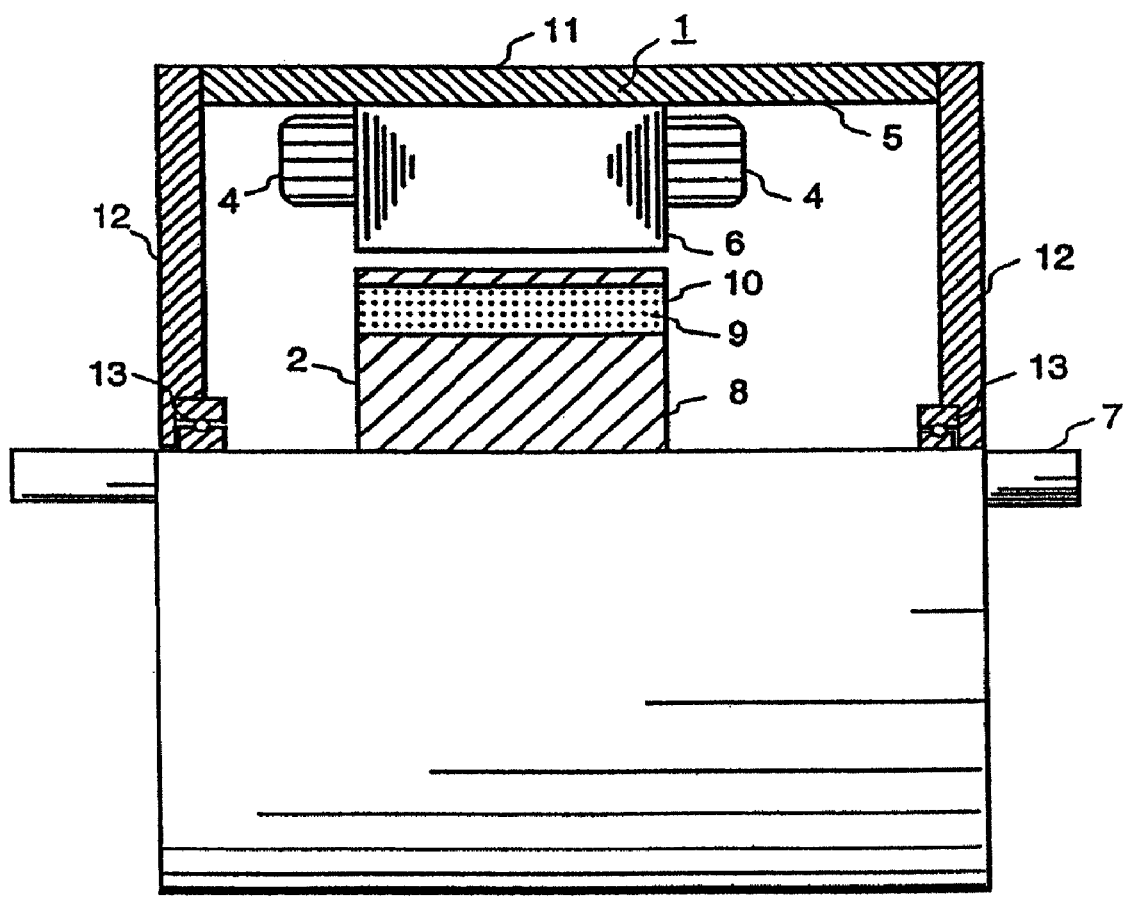

PERMANENT MAGNET ELECTRIC ROTATING MACHINE AND ELECTROMOTIVE VEHICLE USING PERMANENT MAGNET ELECTRIC ROTATING MACHINE

CROSS REFERENCE TO RELATED APPLICATIONS

This application is a divisional of U.S. patent application Ser. No. 12/176,024, filed Jul. 18, 2008, which is a divisional of U.S. patent application Ser. No. 11/509,619, filed Aug. 25, 2006, which is a continuation of U.S. patent application Ser. No. 11/081,686, filed on Mar. 17, 2005, which is a continuation application of U.S. patent application Ser. No. 10/934,625, filed on Sep. 7, 2004, now U.S. Pat. No. 6,876,117, which is a continuation of U.S. patent application Ser. No. 10/338,753, filed on Jan. 9, 2003, now U.S. Pat. No. 6,822,360, which is a continuation of U.S. patent application Ser. No. 09/754,296, filed on Jan. 5, 2001, now U.S. Pat. No. 6,798,103, which is a continuation of U.S. patent application Ser. No. 08/946,581, filed on Oct. 7, 1997, now U.S. Pat. No. 6,208,054, which claims priority to Japan Patent Application No. 8-275826, filed on Oct. 18, 1996, the entire disclosures of which are herein expressly incorporated by reference.

BACKGROUND OF THE INVENTION

1. Technical Field

The present invention relates to a permanent magnet electric rotating machine and an electromotive vehicle using a permanent magnet electric rotating machine and in particularly to a permanent magnet electric rotating machine in which permanent magnets are used as a magnetic flux generating means and an electromotive vehicle such as an electric vehicle which uses the permanent magnet electric rotating machine.

2. Prior Art

Up to now as one kind of an electric rotating machine, a permanent magnet electric rotating machine has been used, in which permanent magnets of the permanent magnet electric rotating machine are used as a magnetic field generating means for a rotor.

As a conventional permanent magnet electric rotating machine, there is a known surface magnet structure permanent magnet electric rotating machine, wherein plural permanent magnets of the permanent magnet electric rotating machine are arranged in parallel and fixed on a surface of a rotor and further adjacent permanent magnets are arranged to have a reversed polarity at a peripheral direction.

However, in the above stated surface magnet structure permanent magnet electric rotating machine, during a high speed rotation there is a possibility of the permanent magnet peeling off due to centrifugal force.

A permanent magnet rotor having a permanent magnet embedding structure permanent magnet electric rotating machine is disclosed in Japanese patent laid-open publication No. Hei 5-76,146. Namely, in the above stated permanent magnet rotor, permanent magnets are inserted in and fixed to holes, such holes extend into an interior portion of the rotor in an axial direction.

Further, so as to aim to simplify a structure for a case in which the rotor having the permanent magnet embedding structure of the permanent magnet electric rotating machine is performed to carry out a skew structure, such a permanent magnet structure of the permanent magnet electric rotating machine is disclosed in Japanese patent laid-open publication No. Hei 5-236,687. Namely, in this permanent magnet structure permanent magnet electric rotating machine, a space is formed from an end face of each of the permanent magnets which are installed in an interior portion of a rotor to an outer periphery of the rotor.

However, in the above stated prior art, there is a problem in which an obtaining of a reluctant (reluctance) torque by auxiliary magnetic poles and a reduction in a cogging torque or a torque pulsation are not incompatible. Hereinafter, in this specification, the torque pulsation indicates one combining both the reluctant torque and the cogging torque.

In the permanent magnet embedding structure permanent magnet electric rotating machine, utilizing the rotor member provided between the adjacent permanent magnets as the auxiliary magnetic pole, a composite vector of an armature magnetomotive force of a stator is controlled to direct toward a side of a rotation direction but not to direct toward a central position direction of the auxiliary magnetic pole, as a result, the reluctant torque can be obtained.

This reluctant torque is added to a main torque generated by the permanent magnets and the entire torque of the permanent magnet electric rotating machine can be increased. Therefore, the efficiency of the permanent magnet embedding structure permanent magnet electric rotating machine can be increased.

On the other hand, in the conventional permanent magnet electric rotating machine, since the permanent magnets always generate a magnetic flux regardless of the existence of an electric power supply, the rotor can always receive a force. The force is one which corresponds to a positional relationship between the permanent magnet and a stator's salient pole portion and during the rotation time the above stated force changes in a pulsed manner. This pulsating force appears as the torque pulsation.

This torque pulsation obstructs a smooth rotation of the rotor, thus causing a problem in which a stable operation of the permanent magnet electric rotating machine cannot be obtained.

In the permanent magnet rotor of the permanent magnet electric rotating machine shown in Japanese patent laid-open publication No. Hei 5-76,146, since the rotor has the auxiliary magnetic poles, it is possible to obtain the reluctant torque. However, since a distance formed between the permanent magnet and the auxiliary magnetic pole is minute in the periphery direction, an abrupt change in a magnet flux density distribution appears in the minute distance portion, accordingly the torque pulsation arises.

On the other hand, in the permanent magnet electric rotating machine shown in Japanese patent laid-open publication No. Hei 5-236,687, the space is formed between the adjacent permanent magnets. In this space, an adherence property fill-up member comprised of a non-magnetic body is located.

Accordingly, the magnet flux density distribution between the adjacent permanent magnets is muted, such that it hardly generates the cogging torque or the torque pulsation. However, the above stated space or the fill-up member does not work as the auxiliary magnetic pole, therefore the reluctant torque can not be obtained.

SUMMARY OF THE INVENTION

An object of the present invention is to provide a permanent magnet electric rotating machine and an electromotive vehicle using a permanent magnet electric rotating machine wherein a torque pulsation can be restrained by obtaining a reluctant torque according to auxiliary magnetic poles.

According to the present invention, a permanent magnet electric rotating machine comprises a stator obtained by a winding on a stator iron core, plural permanent magnet insertion holes for forming magnetic pole piece portions at a side of the stator through auxiliary magnetic pole portions, and a rotor embedding plural permanent magnets in the permanent magnet insertion holes. The rotor is arranged adjacent to the stator with a rotation air gap.

A magnetic gap is provided between at least one of the permanent magnets and at least one of the auxiliary magnetic pole portions which is adjacent to at least one of the permanent magnets in a peripheral direction.

The magnetic gap moderates the change in the magnetic flux density distribution in the peripheral direction between the permanent magnet and the auxiliary magnetic pole portion, accordingly the torque-pulsation can be decreased.

Therefore, the magnetic gap can be formed merely by the space or by the arrangement or the filling-up of the non-magnetic material.

Further, this magnetic gap can be formed at both ends of the permanent magnets and this magnetic gap can be formed at one end of the peripheral direction of the permanent magnet complying with a request of the rotation direction of the permanent magnet electric rotating machine and a use for applying the permanent magnet electric rotating machine.

However, due to the provision of the above described magnetic gap at the peripheral direction end portion of the permanent magnet, there is a possibility that the positioning of the permanent magnet becomes unstable during the high speed rotation, etc.

For the above stated reasons, according to the present invention, an indented portion is provided at a bottom portion of the permanent magnet, and on the indented portion the permanent magnet is arranged and installed in a stable manner. According to the present invention, a nonmagnetic material member is arranged in the magnetic gap.

Further, since the magnetic gap is enough to moderate the magnetic flux density distribution against the stator, by varying the dimension or the width (space) of the magnetic gap, it is possible to assist the functions of the auxiliary magnetic pole portion.

According to the present invention, a peripheral direction width of the magnetic gap at a face of the stator side (an outer peripheral portion of the stator) is formed larger than a peripheral direction width of the magnetic gap at a face of an anti-stator side (an inner peripheral portion of the stator).

According to the present invention, a peripheral direction cross-section of the magnetic gap is a triangular shape. Therefore, it is possible to circulate the magnetic flux of the auxiliary magnetic pole portions around the permanent magnets, as a result the large reluctance torque of the permanent magnet electric rotating machine can be obtained.

According to the present invention, the magnetic pole piece portion is connected to the auxiliary magnetic pole portion through a bridge portion, and a stator side surface and a magnetic gap side surface of the bridge portion are formed substantially in parallel. The bridge portion is formed to extend vertically toward an inclined face of the magnetic gap.

Therefore, it is possible to restrain the magnetic flux leakage from the permanent magnets and the member of the stator side of the magnetic gap to the auxiliary magnetic pole portions.

Further, according to the present invention, the bridge portion is formed to extend vertically toward an inclined face of the magnetic gap, accordingly the centrifugal force given on the permanent magnet can be supported according to the tensile force of the bridge portion, as a result a permanent magnet electric rotating machine capable of higher speed rotation can be obtained.

According to the present invention, a permanent magnet electric rotating machine comprises a stator having a winding on a stator iron core, plural permanent magnet insertion holes for forming magnetic pole piece portions at a side of the stator through auxiliary magnetic pole portions, and a rotor embedded plural permanent magnets in the permanent magnet insertion holes, the rotor being arranged with respect to the stator with a rotation air gap. A magnetic gap is provided between at least one magnetic piece portion and at least one auxiliary magnetic pole portion.

The above stated magnetic gap can moderate the magnetic flux density distribution at the peripheral direction of the rotor between the permanent magnet and the auxiliary magnetic pole portion.

According to the present invention, the magnetic gap contacts a peripheral direction end portion of a face of a stator side of the permanent magnet. The magnetic gap extends toward an inner side of the permanent magnet.

According to the present invention, the magnetic gap extends with a rectangular shape toward an inner side of the permanent magnet. Therefore, it is possible to restrain the magnetic flux from leaking from the face of the stator side of the permanent magnet to the auxiliary magnetic pole portion.

According to the present invention, a permanent magnet electric rotating machine comprises a stator having a winding on a stator iron core, plural permanent magnet insertion holes for forming magnetic pole piece portions at a side of the stator side through auxiliary magnetic pole portions, and a rotor embedded plural permanent magnets in the permanent magnet insertion holes, the rotor being arranged with respect to the stator with a rotation air gap.

A magnetic gap is provided between at least one magnetic piece portion and at least one auxiliary magnetic pole portion, and the magnetic pole piece portion is fixed to the auxiliary magnetic pole portion through a non-magnetic magnetic pole piece supporting member.

According to the present invention, the magnetic pole piece supporting member has a U-shape and the magnetic pole piece supporting member is inserted from both axis of the rotor iron core. Therefore, the centrifugal force of the permanent magnet given on the magnetic pole piece portion can be supported according to the auxiliary magnetic pole portion.

According to the present invention, a permanent magnet electric rotating machine comprises a stator having a winding on a stator iron core, plural permanent magnet insertion holes for forming magnetic pole piece portions at a side of the stator through auxiliary magnetic pole portions, and a rotor embedded plural permanent magnets in the permanent magnet insertion holes, the rotor being arranged with respect to the stator with a rotation air gap.

A magnetic gap is provided between at least one magnetic piece portion and at least one auxiliary magnetic pole portion, a permanent magnet supporting member is arranged between the magnetic pole piece portion and the permanent magnet and the permanent magnet supporting member is assembled according to a magnetic material member and a nonmagnetic material member.

The magnetic material of the permanent magnet supporting member is arranged between the magnetic pole piece portion and the permanent magnet, and the non-magnetic material member of the permanent magnet supporting member is engaged with the magnetic pole piece portion. Therefore, the supporting force against the centrifugal force acting on the permanent magnet can be increased.

According to the present invention, a non-magnetic material member is arranged in the magnetic gap. Therefore, the supporting force against the centrifugal force given on the permanent magnet can be increased.

According to the present invention, a peripheral direction width of the permanent magnet is smaller than a peripheral direction width of the auxiliary magnetic pole portion. Therefore, the centrifugal force acting on the permanent magnet can be effectively lessened.

According to the present invention, an electromotive vehicle is driven by a permanent magnet electric rotating machine. Therefore, the electromotive vehicle having a small cogging torque and a stable drive apparatus can be provided.

The permanent magnet electric rotating machine according to the present invention can be applied to a generator and an electric motor, an inner rotor type and an outer rotor type permanent magnet electric rotating machine, a rotary type and a linear type permanent magnet electric rotating machine, a concentric winding stator structure and a salient winding stator structure permanent magnet electric rotating machine.

The present invention does not depend on the shape of the permanent magnet, therefore the permanent magnet having a rectangular body, an arc shape, and a trapezoid shape. etc. can be applied and similar effects can be obtained.

Other objects, advantages and novel features of the present invention will become apparent from the following detailed description of the invention when considered in conjunction with the accompanying drawings.

BRIEF DESCRIPTION OF THE DRAWING FIGURES

FIG. 2 is an enlarged view showing a surrounding portion of an optional permanent magnet of a rotor of the permanent magnet electric rotating machine shown in FIG. 1;

FIG. 3 is an axial direction cross-sectional view showing one embodiment of the permanent magnet electric rotating machine shown in FIG. 1;

DETAILED DESCRIPTION OF THE DRAWINGS

Hereinafter, one embodiment of a permanent magnet electric rotating machine according to the present invention and an electromotive vehicle using a permanent magnet electric rotating machine according to the present invention will be explained in detail referring to figures.

Figure 1:
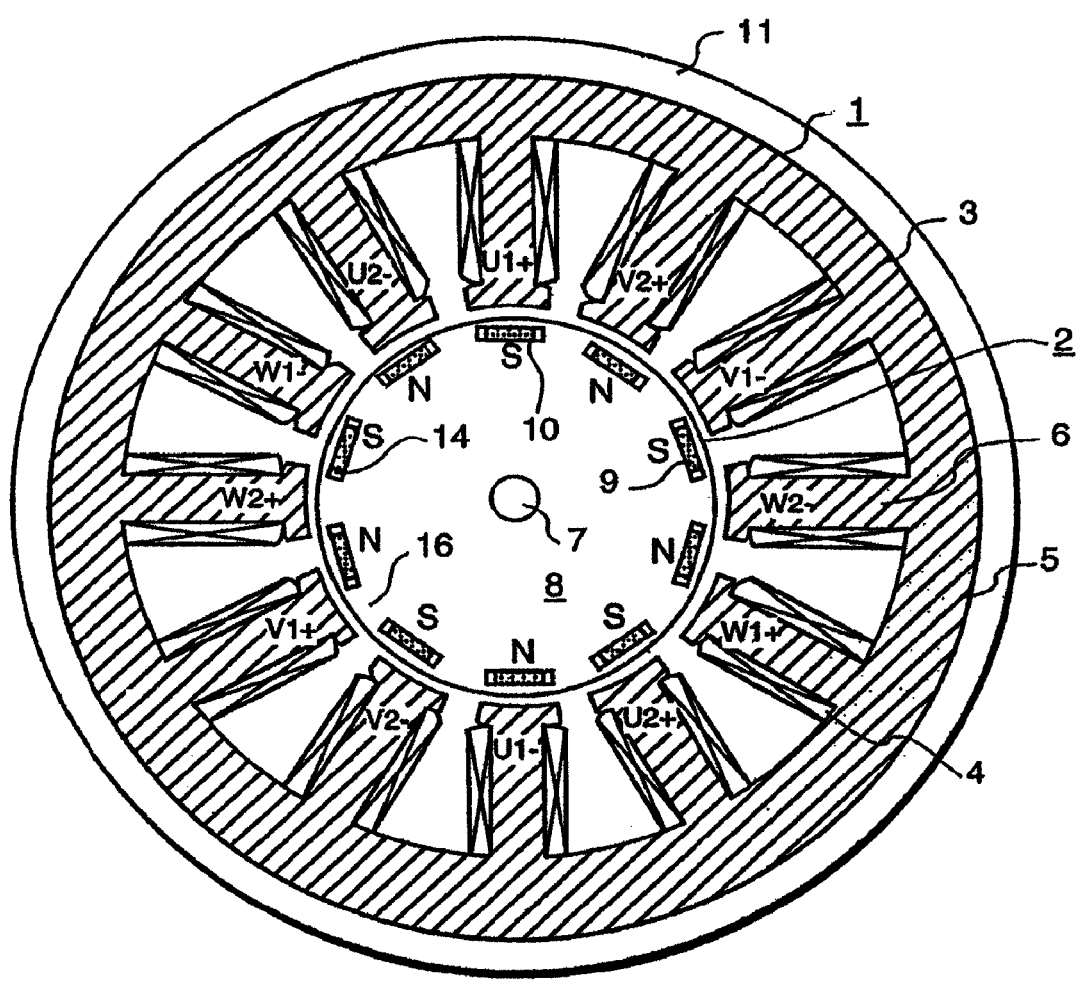
FIG. 1 is an end cross-sectional view showing one embodiment of a permanent magnet electric rotating machine according to the present invention.

FIG. 1 is a cross-sectional view of the periphery of one embodiment of a permanent magnet electric rotating machine according to the present invention having an inner rotor and a concentrated winding stator structure.

A permanent magnet electric rotating machine is constituted by a stator 1 and a rotor 2. The stator 1 and the rotor 2 are arranged with a rotation air gap formed between one another as shown in FIG. 1.

The stator 1 comprises a stator iron core 3 and a stator winding 4. The stator iron core 3 comprises a core portion 5 and a stator salient pole portion 6. In the core portion 5, a magnetic circuit is formed so to pass a magnetic flux to the stator salient pole portion 6. In this stator salient pole portion 6, the stator winding 4 is wound round in a concentrated manner.

The rotor 2 comprises a shaft 7, a rotor iron core 8 and plural permanent magnets 9. In the rotor iron core 8, plural permanent magnet insertion holes 10 in which are inserted the permanent magnets 9 and holes through which the shaft 7 passes are punched out in an axial direction. The permanent magnets 9 are inserted in and fixed respectively to the permanent magnet insertion holes 10. The shaft 7 is inserted in and fixed to the shaft passing-through holes.

As stated in the above, this embodiment of the permanent magnet electric rotating machine according to the present invention is a permanent magnet embedded structure electric rotating machine. By arranging the permanent magnets 9 around the rotor 2 in a ring-like form, a member formed between the adjacent permanent magnet insertion holes 10 can function as an auxiliary magnetic pole 16. Namely, the permanent magnets 9 are arranged separately and equally around the circumference at the same distance in the respective permanent magnet insertion hole 10 of the rotor 2.

In other words, a control apparatus (not shown in the figure) can control a composite force of an armature electromotive force according to the stator winding 4 so as to direct toward a side of a rotation direction but not direct toward a side of a central position direction of the auxiliary magnetic pole 16.

Accordingly, a magnetic flux generated from the stator winding 4 passes through the permanent magnets 9 and the auxiliary magnetic poles 16. A reluctant torque is then generated. This is effective in particular during a low speed operating condition of the permanent magnet electric rotating machine. And further since the above stated reluctant torque is added to an ordinary torque according to the permanent magnets 9, a high torque for an electric motor, for example, can be obtained.

FIG. 3 is a cross-sectional structure at an axial direction showing one embodiment of a permanent magnet electric rotating machine according to the present invention.

The stator 1 is fixed to an inner peripheral surface of a housing 11 and the shaft 7, which is inserted in and fixed to the rotor 2, can rotate freely with a rotation air gap against the stator 1. Further, the shaft 7 is contacted and held by bearing members 13 and end bracket members 12.

In the above described embodiment of the permanent magnet electric rotating machine according to the present invention, as to a material for the rotor iron core 8, the invention employs a rotor iron core 8 having a higher magnetic permeability than a magnetic permeability of the permanent magnet 9, for example using a stator iron core 8 having a high magnetic permeability such as a silicon steel plate.

Since the rotor iron core 8 having the above higher magnetic permeability is employed in the permanent magnet electric rotating machine, it is possible to lessen an eddy current loss which is generated in an interior portion of the permanent magnet 9. Further, the iron core 8 can function effectively with the above stated auxiliary magnetic pole portion 16.

Further, the present invention can apply to a generator and an electric motor, an inner rotor type and an outer rotor type permanent magnet electric rotating machine, a rotary type and a linear type permanent magnet electric rotating machine, and a concentric winding stator structure and a distributed winding-stator structure permanent magnet electric rotating machine. The same effects described above can be obtained.

In this embodiment of the permanent magnet electric rotating machine according to the present invention, a magnetic gap 14 is provided between the permanent magnet 9 and the auxiliary magnetic pole portion 16 which is provided adjacent to the permanent magnets 9 around the periphery.

FIG. 2 is an enlarged view showing a surrounding portion of an optional permanent magnet 9 of the permanent magnet electric rotating machine shown in FIG. 1.

As shown in FIG. 2, the permanent magnet insertion hole 10 is formed so as to provide the magnetic gap 14 at a peripheral end portion of the permanent magnet 9 and the permanent magnet 9, is inserted and fixed to the permanent magnet insertion hole 10. This magnetic gap 14 extends in the axial direction and contacts both the permanent magnet 9 and the auxiliary magnetic pole portion 16.

The functions of the magnetic gap 14 will be explained referring to FIG. 4A, FIG. 4B and FIG. 5A and FIG. 5B.

Figure 4A:
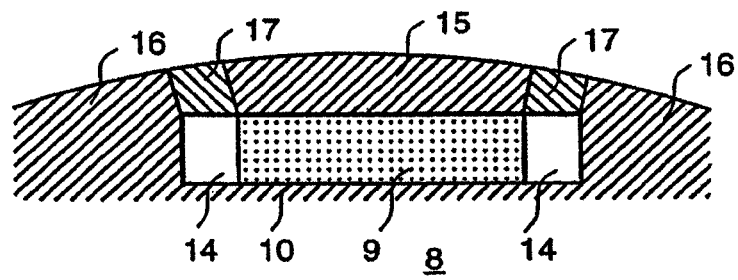
FIG. 4A is a diagram functionally explaining the rotor member of the permanent magnet electric rotating machine shown according to the present invention in FIG. 2.
Figure 4B:
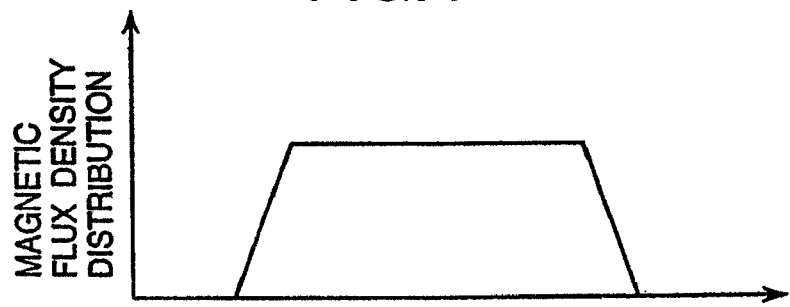
FIG. 4B is a graph showing a magnetic flux density distribution of a rotor member of the permanent magnet electric rotating machine according to the present invention shown in FIG. 2.
Figure 5A:
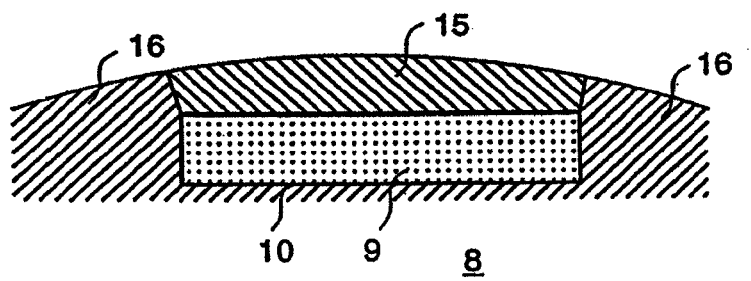
FIG. 5A is a diagram functionally explaining the rotor member of a permanent magnet electric rotating machine according to the prior art.
Figure 5B:
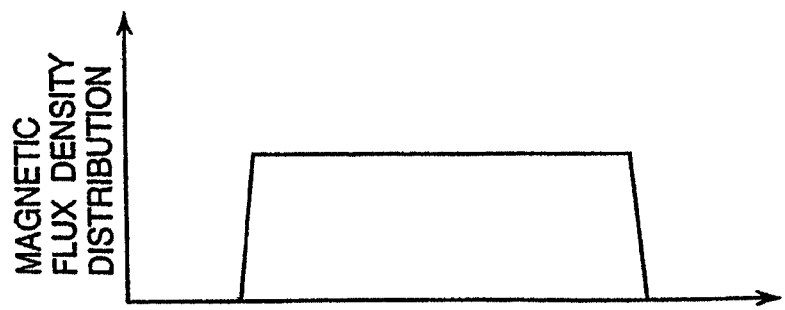
FIG. 5B is a graph showing a magnetic flux density distribution of a rotor member of a permanent magnet electric rotating machine according to the prior art.

FIG. 4A and FIG. 5A show a cross-sectional view of the surrounding portion of the permanent magnet 9 of the permanent magnet electric rotating machine, respectively. FIG. 4B and FIG. 5B show a relationship of a magnetic flux density distribution which is generated from the peripheral surface of the rotor 2 according to the permanent magnet electric rotating machine, respectively.

FIG. 4A and FIG. 4B show the rotor of the above stated embodiment of the permanent magnet electric rotating machine according to the present invention and FIG. 5A and FIG. 5B show a rotor of the permanent magnet electric rotating machine according to the prior art, respectively.

In both the rotors according to the present invention and the prior art, the magnetic pole piece portion 15 of the rotor iron core 8 functions as a member for transmitting the magnetic flux which is generated by the permanent magnets 9 to the stator 1. A member between the adjacent permanent magnet insertion holes 10, namely an auxiliary magnetic pole portion 16 in the figures functions as an auxiliary magnetic pole for generating a reluctance torque.

Each of the graphs shown in FIG. 4B and FIG. 5B indicate the magnetic flux density distributions which are generated at the stator side surface (the outer peripheral surface of the rotor 2) of the rotor 2, respectively. In both figures, at the magnetic pole pieces 15, the magnetic flux which is generated from the permanent magnets 9 indicates substantially constant magnetic flux density distributions.

On the other hand, at the auxiliary magnetic pole portions 16, the magnetic flux from the permanent magnets 9 is barely transmitted and the magnetic flux which is generated from the stator side surface (the outer peripheral surface of the rotor 2) of the rotor 2 becomes substantially zero.

However, in the conventional rotor of the permanent magnet electric rotating machine, as shown in FIG. 5A, since the permanent magnet 9 is arranged to be embedded in the entire permanent magnet insertion hole 10, at a boundary portion between the magnetic pole piece portion 15 and the auxiliary magnetic pole portion 16, an abrupt change in the magnetic flux density distribution appears as shown in FIG. 5B.

In the permanent magnet electric rotating machine, regardless of the existence of the electric power supply to the electric rotating machine, since the permanent magnet always generates the magnetic flux, the rotor always receives a force in response to a positional relationship between the stator salient pole portions 6 and the magnetic pole piece portions 15.

When the rotor rotates, since the position between the stator salient pole portion 6 and the magnetic pole piece portion 15 changes, a force for receiving the rotor 2 changes in a pulsed manner and this change appears as the cogging torque and the torque pulsation. The more abrupt the change of the magnetic flux density distribution at the rotor peripheral direction, the greater the torque pulsation that appears.

In accordance with the reasons stated above, by providing the magnetic gap 14 as shown in this embodiment of the permanent magnet electric rotating machine according to the present invention, the change of the magnetic flux density distribution can be performed gradually.

A bridge portion 17 is formed between the auxiliary magnetic pole portion 16 of the surface of the rotor 2 and the magnetic pole piece portion 15, and also a distance is provided between the magnetic pole piece portion 15 and the auxiliary magnetic pole portion 16.

Accordingly, as shown the graph shown in FIG. 4B, the change of the magnetic flux density distribution according to the present invention appears gradually in comparison with the change of the magnetic flux density distribution shown in FIG. 5B according to the prior art. Therefore, in the present invention, the cogging torque and the torque pulsation of the permanent magnet electric rotating machine can be restrained.

Further, in the permanent magnet electric rotating machine in which the rotation direction is determined to be in only one direction, the magnetic gap 14 may be provided only at one peripheral end of the permanent magnet 9.

Further, in the embodiment of the permanent magnet electric rotating machine according to the present invention, a rectangularly shaped permanent magnet 9 is used. However, the invention can employ a permanent magnet electric rotating machine having other shapes for the permanent magnets, for example, an arc shaped permanent magnet in which the magnetic gap 14 is formed and a trapezoidal shaped permanent magnet in which the magnetic gap 14 is formed.

In the permanent magnet electric rotating machine comprised of the other shapes similar effects are obtained in this embodiment of the permanent magnet electric rotating machine according to the present invention.

Other embodiments of the permanent magnet electric rotating machine according to the present invention will be explained referring to FIG. 6 to FIG. 8.

Figure 6:
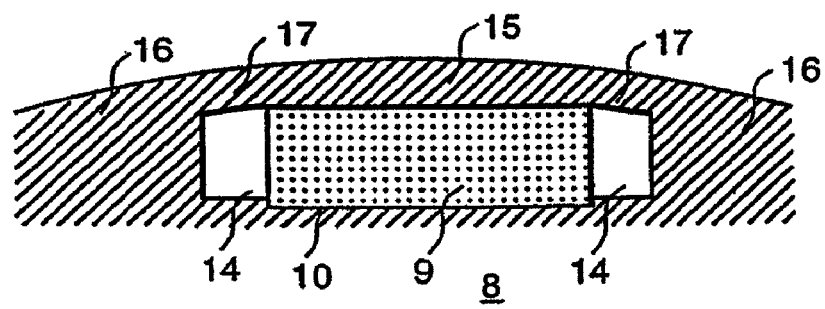
FIG. 6 is a cross-sectional view of the periphery of another embodiment of a permanent magnet electric rotating machine according to the present invention.
Figure 7:
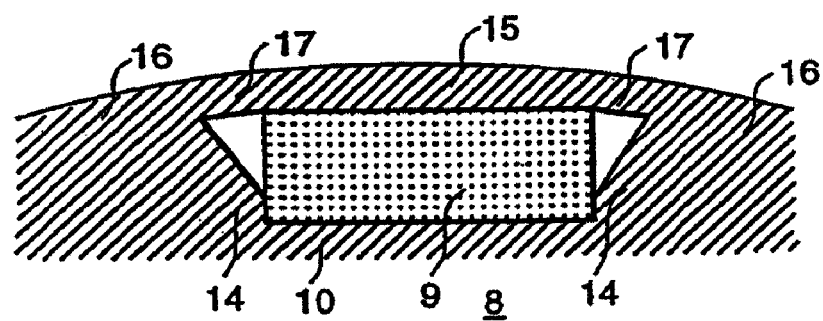
FIG. 7 is a cross-sectional view of the periphery of a rotor of another embodiment of the permanent magnet electric rotating machine according to the present invention.

In the embodiment of the permanent magnet electric rotating machine shown in FIG. 6 and FIG. 7, the shape of the magnetic gap 14 is varied with respect to the shape of the magnetic gap 14 of the above described embodiment of the permanent magnet electric rotating machine shown in FIG. 2.

In the embodiment of the permanent magnet electric rotating machine shown in FIG. 6, an indented portion is provided at a bottom portion of the permanent-magnet insertion hole 10, and the permanent magnet 9 is arranged in this indented portion and is installed in a stable manner. As a result, the thickness of the magnetic gap 14 along a radial direction is made thinner than a thickness of the permanent magnet 9 along its radial direction.

As shown in FIG. 6, a face of the magnetic gap 14 which faces the stator (an inner peripheral side of the rotor) is formed differently from a stator side face (an outer peripheral side of the rotor) in comparison to the face of the permanent magnet 9 which faces away from the stator.

With the above described structure of the permanent magnet electric rotating machine according to the present invention, the permanent magnet 9 can be positioned suitably to a predetermined position of the permanent magnet insertion hole 10.

Further, to determine the position of the permanent magnet 9, a non-magnetic material member is arranged to fill-up the magnetic gap 14, even in this case the similar effects described for the above embodiment can be obtained. For example, a solid body comprised of a non-magnetic material member is arranged in the magnetic gap 14, and using a resin member and an adhesive agent the solid body is fixed integrally to the permanent magnet 9, accordingly the permanent magnet 9 can be stably arranged.

Further, in the embodiment of the permanent magnet electric rotating machine according to the present invention shown in FIG. 7, a circumferential direction width of the magnetic gap 14 facing the stator side (the outer peripheral side of the rotor) is made larger than the width of the magnetic gap 14 at the face away from the stator side (the inner peripheral side of the rotor).

In FIG. 7, in particular, a circumferential cross-section of the magnetic gap 14 is formed with a substantial triangular shape. With the above stated permanent magnet electric rotating machine structure according to the present invention, the magnetic flux passing-through the auxiliary magnetic pole portions 16 can circulate smoothly around the permanent magnets 9, therefore the permanent magnet electric rotating machine having a large reluctance torque can be obtained.

Further, in the embodiments of the permanent magnet electric rotating machines according to the present invention shown in FIG. 6 and FIG. 7, the face of the magnetic gap 14 at the stator side is formed substantially in parallel to the surface of the rotor 2 at the stator side.

With the above stated permanent magnet electric rotating machine structures according to the present invention, the magnetic saturation of the bridge portions 17 proceeds easily, according to the magnetic flux generated from the permanent magnets 9 through the magnetic pole piece portions 15 and the bridge portions 17, the magnetic flux leakage due to the auxiliary magnetic pole portions 16 can therefore be restrained.

Figure 8:
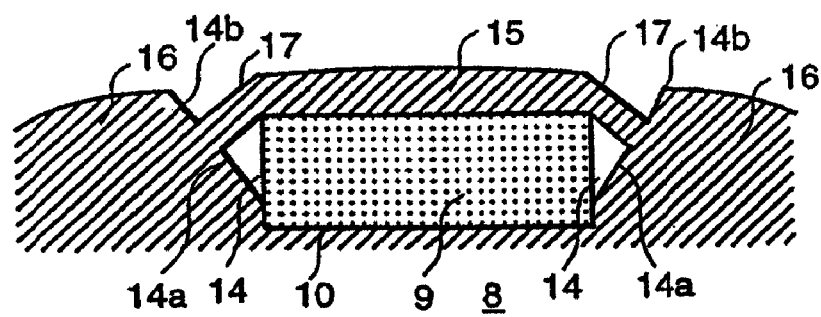
FIG. 8 is a cross-sectional view of the periphery of a rotor of a further embodiment of a permanent magnet electric rotating machine according to the present invention.

In the embodiment of the permanent magnet electric rotating machine according to the present invention shown in FIG. 8, to obtain the similar structure shown in the above stated embodiments, in reversal the shape of the rotor 2 is varied or modified. Namely, the bridge portion 17 having an inclined face 14b is constructed to extend substantially vertically against an inclined face 14a of the magnetic gap 14.

With the above stated structure permanent magnet electric rotating machine, since an inclination of the bridge portion 17 against the radial direction of the rotor 12 becomes large, a centrifugal force operating on the magnetic pole piece portion 15 and the permanent magnet 9 can be supported according to a tensile force of the bridge portion 17.

In general, the durability of the material of the permanent magnet electric rotating machine is higher at the tensile force than at a shearing force. The durability against the centrifugal force in this embodiment becomes high in comparison with the above stated embodiment of the permanent magnet electric rotating machine in which the bridge portion 17 is positioned substantially at a right angle to the radial direction of the rotor 2.

Accordingly, by forming a thinner bridge portion 17, it is possible to increase the amount of the effective magnetic flux which is generated in the permanent magnet 9, and further it can rotate the rotor 2 at a high speed.

Further embodiments of the permanent magnet electric rotating machines according to the present invention will be explained referring to FIG. 9 to FIG. 11.

Figure 9:
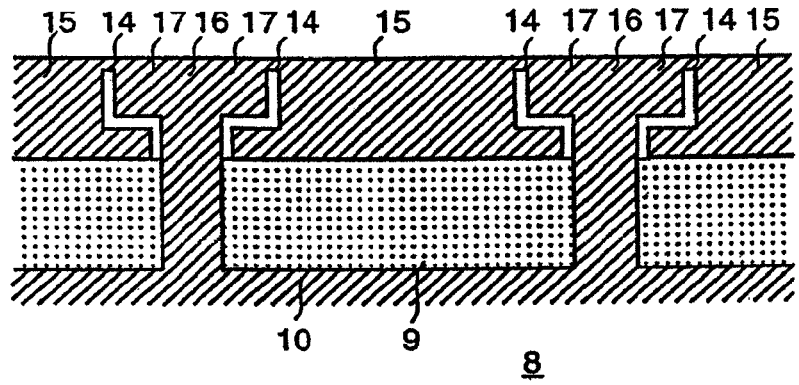
FIG. 9 is a cross-sectional development view of the periphery of a rotor of a further embodiment of a permanent magnet electric rotating machine according to the present invention.
Figure 10:
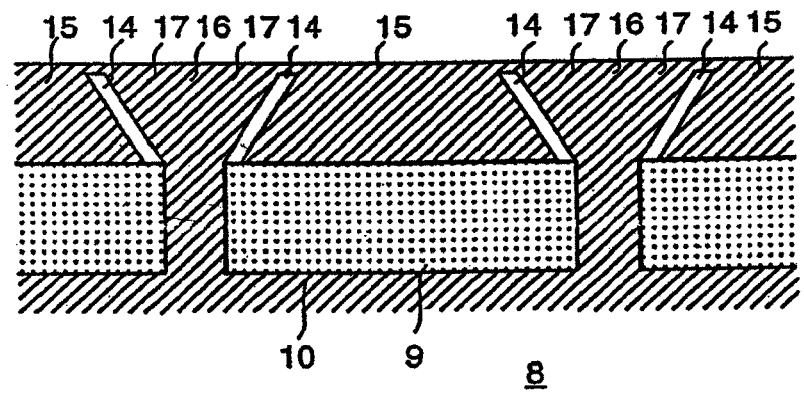
FIG. 10 is a cross-sectional development view of the periphery of a rotor of a further embodiment of a permanent magnet electric rotating machine according to the present invention.
Figure 11:
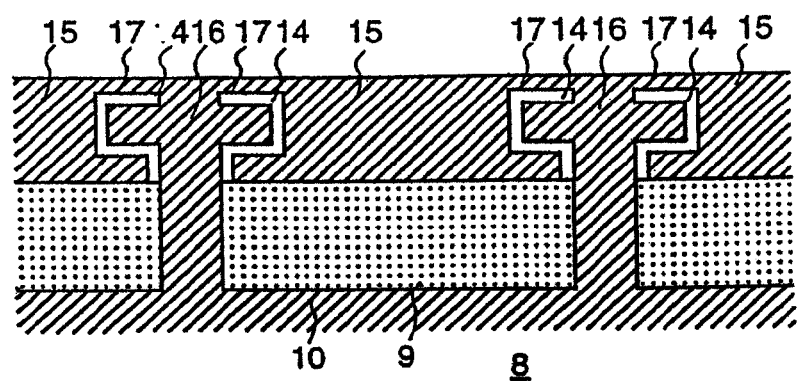
FIG. 11 is a cross-sectional development view of the periphery of a rotor of a further embodiment of a permanent magnet electric rotating machine according to the present invention.

In the embodiments of the permanent magnet electric rotating machines according to the present invention shown in FIG. 9 to FIG. 11, the magnetic gap 14 is provided between the magnetic pole piece portion 15 and the auxiliary magnetic pole portions 16. As shown in the figures, the magnetic gap 14 is formed at both ends of the magnetic pole piece portions 15.

The magnetic gap 14 extends along in the axial direction from an edge portion of the stator side peripheral direction of the permanent magnet 9. By providing this magnetic gap 14, the bridge portion 17 as shown in the figures is formed and the magnetic flux at the bridge portion 17 changes gradually, as a result it is possible to restrain the cogging torque.

In those embodiments of the permanent magnet electric rotating machines according to the present invention, the magnetic gap 14 contacts the peripheral direction of face of the stator side of the permanent magnet 9, and further this magnetic gap 14 is formed to get into an inner portion side than a side of the peripheral direction end face of the permanent magnet 9.

Further, in the permanent magnet electric rotating machine structure according to the present invention shown in FIG. 10, the magnetic gap 14 is formed to extend toward an inner portion side of the permanent magnet 9, and in the permanent magnet electric rotating machine structure shown in FIG. 11, the magnetic gap 14 is formed to extend in a rectangular shape toward an inner portion side of the permanent magnet 9.

With the above stated permanent magnet electric rotating machine structures according to the present invention, the magnetic flux leakage to the auxiliary magnetic pole portion 16 can be decreased, the magnetic density at the magnetic pole piece portion 15 is increased, and accordingly the efficiency of the permanent magnet electric rotating machine can be increased.

Further embodiments of the permanent magnet electric rotating machines according to the present invention will be explained referring to FIG. 12 to FIG. 14.

In the case where the rotor comprised of the permanent magnet embedded type structure permanent magnet electric rotating machine rotates at a high speed, the centrifugal forces affecting the permanent magnet 9 increase and also the burden of the member for supporting the permanent magnet 9, namely the burdens on the magnetic pole piece portion 15 and the bridge portion 17 increase.

In a case where in response to the above burden a thick supporting member of the permanent magnet electric rotating machine is provided, the distance between the surface of the rotor 2 and the permanent magnet 9 becomes large and the magnetic flux thus leaks to the auxiliary magnetic pole portion 16. As a result, problems arise in that the magnetic flux transmitted from the permanent magnet 9 to the stator 1 decreases and also the torque decreases.

Figure 12:
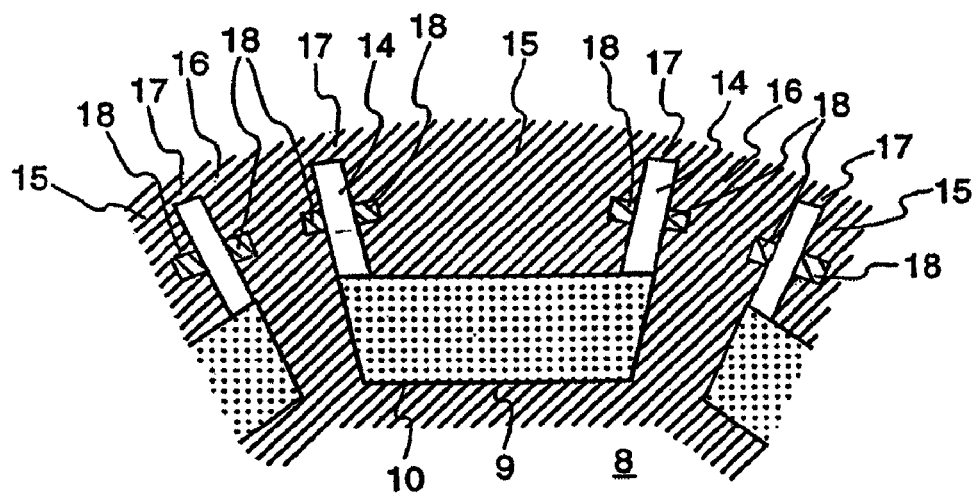
FIG. 12 is a cross-sectional view of the periphery of a rotor of a further embodiment of a permanent magnet electric rotating machine according to the present invention.

For the above given reasons, at the peripheral direction of both ends of the permanent magnet 9 at the face of the stator side, as shown in the cross-sectional view of FIG. 12, the magnetic gap 14 is formed to extend to the axial direction. Further, to sandwich or to form the magnetic gap 14, a magnetic pole piece supporting member 18 is inserted at the axial direction and fixed to the magnetic pole piece portion 15 and the auxiliary magnetic pole portion 16.

Figure 13:
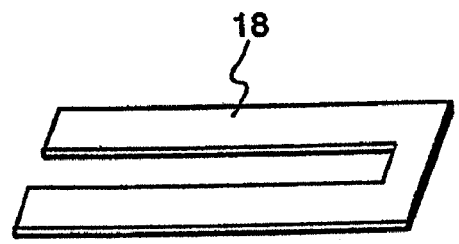
FIG. 13 is a perspective view showing a magnetic pole supporting member shown in FIG. 12.

FIG. 13 shows one example of the magnetic pole piece supporting member 18. The magnetic pole piece supporting member 18 is comprised of a member of a nonmagnetic resin material member having a U-shape and has an inner hollow portion. A lateral direction width of the inner hollow portion of the magnetic pole piece supporting member 18 corresponds to a lateral direction width of the magnetic gap 14.

Figure 14:
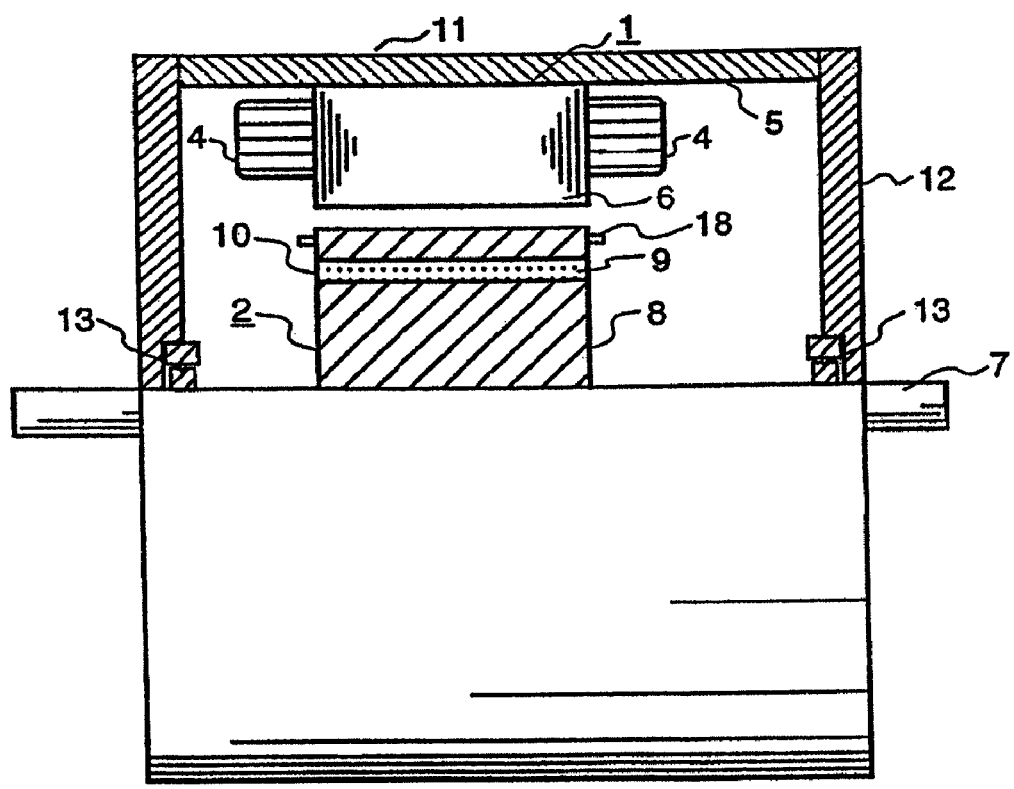
FIG. 14 is an axial direction cross-sectional view showing the permanent magnet electric rotating machine shown in FIG. 12.

FIG. 14 is an axial direction cross-sectional view showing the permanent magnet electric rotating machine having the rotor 2 in which the magnetic pole piece supporting member 18 is inserted from both sides of the magnetic pole piece portion 15 and the auxiliary magnetic pole portion 16.

Herein, the magnetic gap 14 restrains the magnetic flux which leaks from the magnetic pole piece portion 15 to the auxiliary magnetic pole portion 16. The magnetic pole piece supporting member 18 operates as a medium body for supporting a centrifugal force of the permanent magnet 9 given on the magnetic pole piece portion 15 and a centrifugal force of the magnetic pole piece portion 15 itself according to the auxiliary magnetic pole portion 16. As a result, the supporting force of the permanent magnet 9 against the centrifugal force can be increased.

Further, after assembling the rotor 2, by cutting the bridge portion 17 shown in FIG. 12 and further by maintaining the supporting force of the magnetic pole piece portion 15 according to the magnetic pole piece supporting member 18, the leakage magnetic flux according to the bridge portion 17 can be decreased.

A further embodiment of the permanent magnet electric rotating machine according to the present invention will be explained referring to FIG. 15.

Figure 15:
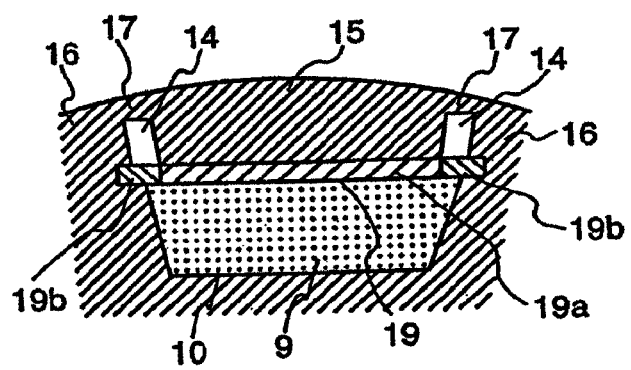
FIG. 15 is a cross-sectional view of the periphery of a rotor of a further embodiment of a permanent magnet electric rotating machine according to the present invention.

In this embodiment of the permanent magnet electric rotating machine, as shown in FIG. 15, the magnetic gap 14 is provided between the magnetic pole piece portion 15 and the auxiliary magnetic pole portion 16. A permanent magnet supporting member 19 is provided between the permanent magnets 9. The magnetic pole piece portion 16 and this permanent magnet supporting member 19 are formed by assembling a magnetic material member 19a and a non-magnetic material member 19b.

The permanent magnet supporting member 19, as shown in figure, is comprised of an assembling member of the magnetic material member 19a and the nonmagnetic material member 19b. The magnetic material member 19a and the non-magnetic material member 19b are joined according to a type of welding process etc.

The magnetic material member 19a is constituted by the magnetic material member to transmit the generated magnetic flux of the permanent magnet 9 to the magnetic pole piece portion 15. On the other hand, the nonmagnetic material member 19b is constituted by the nonmagnetic material member to restrain the leakage magnetic flux from the permanent magnet 9 to the auxiliary magnetic pole portion 16.

With the above described permanent magnet electric rotating machine structure according to the present invention, since the centrifugal force upon the permanent magnet 9 is supported by the auxiliary magnetic pole portion 16 through the permanent magnet supporting member 19, only the centrifugal force of the magnetic pole piece portion 15 acts on the bridge portion 17. Accordingly, a length of the bridge portion 17 at the radial direction can be shortened and further the magnetic flux leakage from the permanent magnet 9 can be lessened.

Besides, in the embodiments of the permanent magnet electric rotating machine structures shown in FIG. 9 to FIG. 11, it is effective to arrange or fill up a non-magnetic material member.

The thickness of the magnetic pole piece portion 15 is set to a thickness necessary to obtain sufficient magnetic flux. The magnetic gap 14 is punched out at the stator side of the permanent magnet 9 with the shapes as shown in FIG. 9 to FIG. 11 and in this magnetic gap 14 a non-magnetic material member, for example such as an adhesive agent and a resin member, is filled up.

With the above stated permanent magnet electric rotating machine structure according to the present invention, without the thick thickness of the magnetic pole piece portion 15 at the radial direction, the centrifugal force received by the permanent magnets 9 and the magnetic pole piece portions 15 can be supported by the magnetic gap 14.

Further, as the material for the permanent magnet 9, it is possible to employ a resin mold type magnet. In this case, in replacement of the non-magnetic material member for filling up the magnetic gap 14, the resin mold type magnet can be inserted having a shape suitable for both the permanent magnet insertion hole 10 and the shape of the magnetic gap 14.

Figure 16:
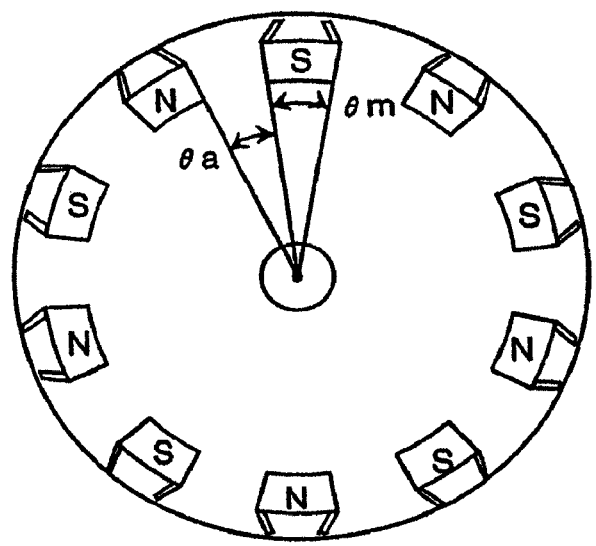
FIG. 16 is a cross-sectional view showing a rotor of a further embodiment of a permanent magnet electric rotating machine according to the present invention.

In other words, to a plastic magnet itself it is possible to serve the above stated role by the magnetic gap 14. Further, as shown in FIG. 16, it is effective to provide a larger peripheral direction width ($\theta_a$) of the auxiliary magnetic pole portion 16 than the peripheral direction width ($\theta_m$) of the permanent magnet 9.

With the above stated permanent magnet electric rotating machine structure according to the present invention, the weight of the permanent magnet 9 for producing the centrifugal force given on the bridge portion 17 is lessened and the thickness of the bridge portion 17 can be made thinner, accordingly the leakage magnetic flux leaking from the magnetic pole piece portion 15 to the auxiliary magnetic pole portion 16 can be decreased.

Further, since the peripheral direction width of the permanent magnet 9 can be made thinner, the magnetic flux generated by the permanent magnet 9 decreases. However, the reluctance torque according to the auxiliary magnetic pole portion 16 increases relatively. This fact is effective to use a high cost neodymium magnet as the permanent magnet 9.

As a compensation in order to lower the cost, the size of the permanent magnet 9 can be decreased according to the reluctance torque of the auxiliary magnetic pole portion 16, thus an improvement in the cost performance of the permanent magnet electric rotating machine can be attained.

Further, by applying the permanent magnet electric rotating machine described above to an electromotive vehicle, in particular to an electric vehicle, since the cogging torque can be small, it can mount a stable permanent magnet electric rotating machine drive apparatus which can start smoothly. As a result, the electric vehicle having a long running distance per one time charging or having a small consumption of electric power can be provided.

According to the present invention, the permanent magnet electric rotating machine having a small torque pulsation can be constituted. Further, according to the present invention, it is possible to set the positioning of the permanent magnet of the permanent magnet electric rotating machine.

According to the present invention, in the permanent magnet electric rotating machine it is possible to circulate smoothly the magnetic flux passing-through the auxiliary magnetic pole portion around the permanent magnet. Further, in the permanent magnet electric rotating machine it is possible to restrain the magnetic flux leakage from the member of the stator side of the magnetic gap in the permanent magnet to the auxiliary magnetic pole portion.

According to the present invention, the permanent magnet electric rotating machine having the small torque pulsation can be realized. Further, according to the present invention, it is possible to restrain the magnetic flux leakage from the permanent magnet at the face of the stator side to the auxiliary magnetic pole portion of the permanent magnet electric rotating machine.

According to the present invention, it is possible to secure the supporting force against the centrifugal force acting on the permanent magnet of the permanent magnet electric rotating machine. Further, according to the present invention, an electromotive vehicle, which is comprised of the permanent magnet electric rotating machine, having the small cogging torque and having the stable drive apparatus, can be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A permanent magnet electric rotating machine, comprising:
   a stator;
   a rotor arranged opposite said stator with a rotation air gap in between, and said rotor having a rotor iron core;
   a plurality of magnetic poles in said rotor iron core and arranged in the peripheral direction in said rotor;
   iron core portions disposed peripherally between said magnetic poles, each of which iron core portions has an area in which magnetic flux which is generated by said magnetic poles, and which exits the outer peripheral surface of the rotor, is substantially zero; and
   magnetic gaps disposed adjacent to each magnetic poles;
   wherein a thickness of each of said magnetic gaps in a circumferential direction of said rotor is larger at a portion thereof which is radially closer to said air gap than at a portion thereof that is radially farther from said air gap.

2. A permanent magnet electric rotating machine according to claim 1, wherein said magnetic poles are embedded permanent magnets.

3. A permanent magnet electric rotating machine according to claim 1, wherein a stator winding is wound around a stator salient pole portion in a concentrated manner.

4. A permanent magnet electric rotating machine according to claim 1, wherein a three phase winding is wound around a stator salient pole portion.

5. A permanent magnet electric rotating machine according to claim 1, wherein an axial cross section of said magnetic poles is rectangular.

6. A permanent magnet electric rotating machine according to claim 1, wherein the number of magnetic poles is 10.

7. A permanent magnet electric rotating machine according to claim 1, wherein said magnetic poles having said iron core portion therebetween are magnetized with opposite magnetic polarity.

8. A vehicle having permanent magnet electric rotating machine according to claim 1, and a controller, wherein, when said rotating electric machine is operated as a motor, said controller controls a composite vector of an armature electromotive force by controlling stator winding current so as to shift the composite vector forward in the direction of rotation, but not so that it is aligned with a central position of said iron core portion.

9. A permanent magnet electric rotating machine, comprising:
   a stator;
   a rotor arranged opposite said stator with a rotation air gap in between, said rotor having a rotor iron core;
   a plurality of magnetic poles in said rotor iron core and arranged in the peripheral direction in said rotor;
   iron core portions disposed peripherally between said magnetic poles, each of which iron core portions has an area in which magnetic flux which is generated by said magnetic poles, and which exits the outer peripheral surface of the rotor, is substantially zero; and
   magnetic gaps disposed adjacent to said magnetic poles;
   wherein a radial extent of said magnetic poles at circumferential extremities thereof is larger than a radial extent of said magnetic gaps at a location adjacent thereto.

10. A permanent magnet electric rotating machine, comprising:
    a stator;
    a rotor arranged opposite said stator with a rotation air gap in between, said rotor having a rotor iron core;
    a plurality of magnetic poles in said rotor iron core and arranged in the peripheral direction in said rotor;
    a plurality of auxiliary magnetic pole portions which are formed peripherally between said magnetic poles; and
    magnetic gaps disposed adjacent to said magnetic poles;
    wherein a thickness of each of said magnetic gaps in a circumferential direction of said rotor is larger at a portion thereof which is radially closer to said air gap than at a portion thereof that is radially farther from said air gap.

11. A permanent magnet electric rotating machine according to claim 10, wherein said magnetic poles are embedded permanent magnets.

12. A permanent magnet electric rotating machine according to claim 10, wherein a stator winding is wound around a stator salient pole portion in a concentrated manner.

13. A permanent magnet electric rotating machine according to claim 10, wherein a three phase winding is wound around a stator salient pole portion.

14. A permanent magnet electric rotating machine according to claim 10, wherein an axial cross section of said magnetic poles is rectangular.

15. A permanent magnet electric rotating machine according to claim 10, wherein the number of magnetic poles is 10.

16. A permanent magnet electric rotating machine according to claims 10, wherein said magnetic poles having said iron core portion therebetween are magnetized with opposite magnetic polarity.

17. A vehicle having permanent magnet electric rotating machine according to claim 10, and a controller, wherein, when said rotating electric machine is operated as a motor, said controller controls a composite vector of an armature electromotive force by controlling stator winding current so as to shift the composite vector forward in the direction of rotation, but not so that it is aligned with a central position of said iron core portion.

18. A permanent magnet electric rotating machine, comprising:

a stator;

a rotor arranged opposite said stator with a rotation air gap in between, said rotor having a rotor iron core;

a plurality of magnetic poles in said rotor iron core and arranged in the peripheral direction in said rotor;

a plurality of auxiliary magnetic pole portions which are formed peripherally between said magnetic poles; and magnetic gaps disposed adjacent to said magnetic poles;

wherein a radial extent of said magnetic poles at circumferential extremities thereof is larger than a radial extent of said magnetic gaps at a location adjacent thereto.

* * * * *